United States Patent

[11] 3,590,435

| [72] | Inventors | Philip N. Dunham<br>Biddeford;<br>Ansel W. Dunham, Saco, both of, Maine |
|---|---|---|
| [21] | Appl. No. | 739,396 |
| [22] | Filed | June 24, 1968 |
| [45] | Patented | July 6, 1971 |
| [73] | Assignee | Philips Maine Corporation<br>Biddeford, Maine |

[54] ROTARY MOLDING
10 Claims, 7 Drawing Figs.

[52] U.S. Cl. .................................................. 18/26
[51] Int. Cl. ................................................... B29c 5/04
[50] Field of Search .......................................... 18/26 R

[56] References Cited
UNITED STATES PATENTS

| 3,388,429 | 6/1968 | Barnett et al. | 18/26 |
| 2,834,986 | 5/1958 | Bailey et al. | 18/26 R |
| 3,117,346 | 1/1964 | Bertin et al. | 18/26 R |
| 3,326,142 | 6/1967 | Town | 18/26 R X |
| 3,350,745 | 11/1967 | Schott et al. | 18/26 R |
| 3,369,274 | 2/1968 | Dicks et al. | 18/26 R X |
| 3,416,193 | 12/1968 | Freeborn | 18/26 R |
| 3,454,988 | 7/1969 | Cremer | 18/26 R |

FOREIGN PATENTS

| 767,547 | 9/1967 | Canada | 18/26 R |

Primary Examiner—Andrew R. Juhasz
Attorney—Morse, Altman & Oates

ABSTRACT: Drums are mounted for simultaneous rotation about a first axis and independently about a perpendicular second axis and are adapted to contain molds each having a charge of thermosetting plastic. The drums are mounted on a common shaft through which a heating and cooling medium is separately delivered with one drum being heated while the other drum is being cooled in alternating sequence. A valving arrangement automatically shifts the mediums from one drum to another in automatic controlled sequence whereby one drum is heated while the other is being cooled. The drums are rotated about the common first axis at the same speed while driven about the perpendicular second axis by separate driving means whereby they may be rotated at different speeds about the second axis.

INVENTORS
PHILIP N. DUNHAM
ANSEL W. DUNHAM

ATTORNEYS 3,590,435

ROTARY MOLDING

BACKGROUND OF THE INVENTION

1. Field of the Invention

This invention relates generally to rotary molding and more particularly is directed towards a new and improved rotary molding apparatus of compact, highly efficient design permitting sequential molding operations to be carried out in two different drums with materials having the same or different molding characteristics. In a modification a single drum is used for molding large objects.

2. Description of the Prior Art

Most rotary molding equipment heretofore available involved the use of a carrier bracket on which the molds were mounted with the carrier bracket being rotated about two mutually perpendicular axes. The rotating carrier bracket was moved first into a heating chamber where the plastic charge was cured as the material was deposited over the inside mold surfaces. Once the plastic was cured the mold was then transferred into a cooling chamber where the plastic was set. The bracket was then withdrawn from the cooling chamber, and the products stripped from the molds. The equipment involved for this type of molding operation was large, complex and expensive. Other types of rotary molding mechanisms are organized about a fixed support and rotate molds about two mutually perpendicular axes with both molds being heated or cooled together through internal means. The latter apparatus, while not requiring the large amount of space needed by the former, is lacking in flexibility in that the mold supports are geared together and the heating and cooling operations are carried out cyclically and simultaneously whereby only a single line of products may be run conveniently at any one time on a batch basis.

It is therefore an object of the present invention to provide improvements in rotary molding methods and equipment and more particularly to provide rotary molding equipment of greatly improved operating flexibility, compactness and economy to accommodate a wide variety of molding materials.

SUMMARY OF THE INVENTION

The present invention features a rotary molding apparatus in which at least two drums which serve as ovens are rotated on a common trunnion or shaft about a horizontal first axis at the same speed and independently about a second axis perpendicular to the first axis by separately driven means whereby the drums may be rotated about the second axis at different selected speeds. The heating and cooling media are delivered separately through the trunnion axis selectively to the drums, with a valve being employed to direct the heating medium into one drum while directing the cooling medium into the other drum, the valve being adapted to switch from one drum to another either manually or according to a predetermined schedule. In this fashion, different types of molds and different types of molding materials may be used in the apparatus at the same time insofar as one drum may be rotated at one speed and the other drum at a different speed with different heating and cooling cycles being applied. Also, after total distribution of material on the inner walls of the molds has been achieved one drum may be idled about its second axis perpendicular to the force of gravity while the other drum is stopped and the molds within the drums charged or stripped without impairing the molding action of the other drum. This invention also features a novel balanced heating system for a molding apparatus, novel bearings and drive system for the apparatus and a novel arrangement for mounting molds to the drums. In a modification a single drum is employed for molding large objects.

DESCRIPTION OF THE PREFERRED EMBODIMENTS

Figure 1:
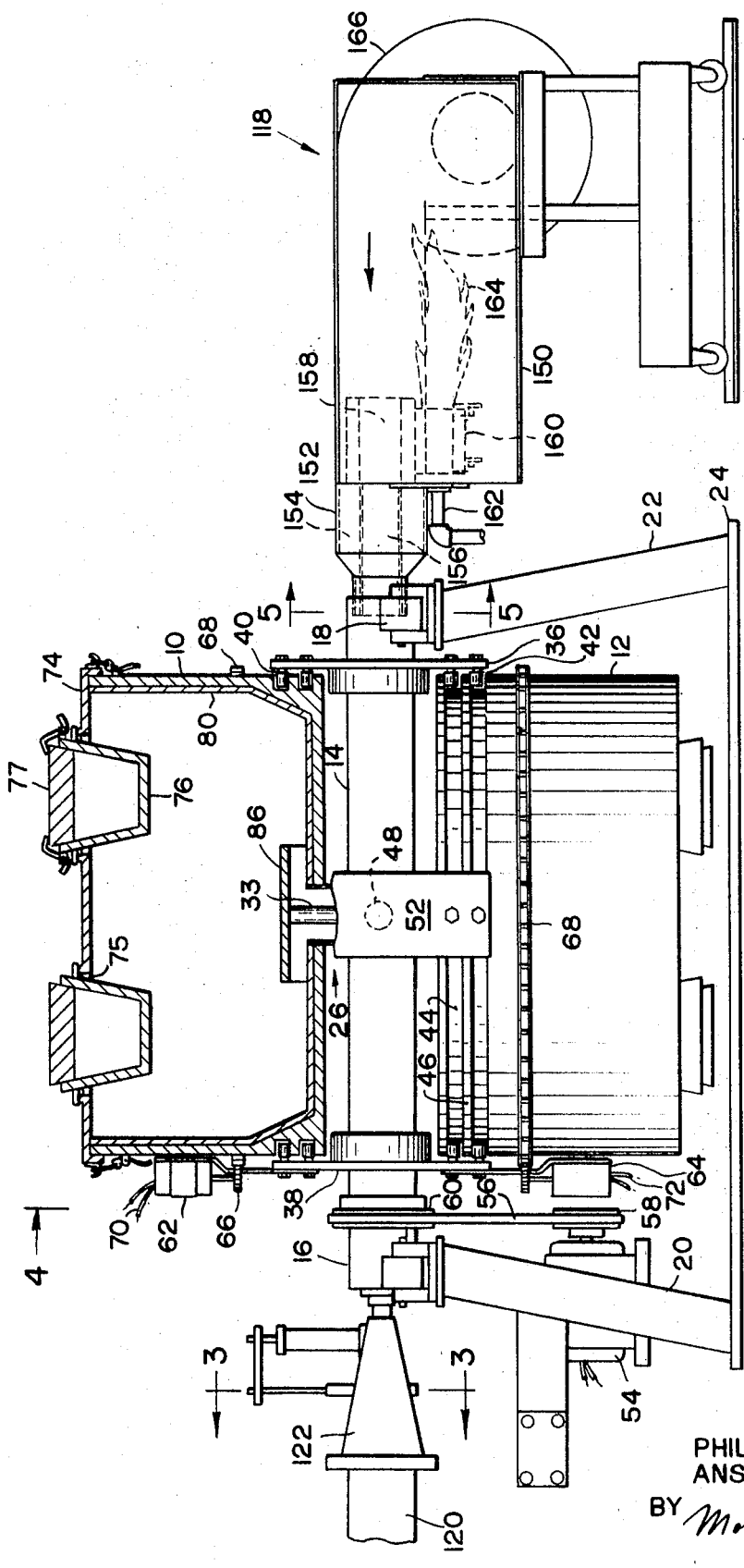
FIG. 1 is a view in front elevation, partly in section of a rotary molding apparatus made according to the invention.
Figure 2:
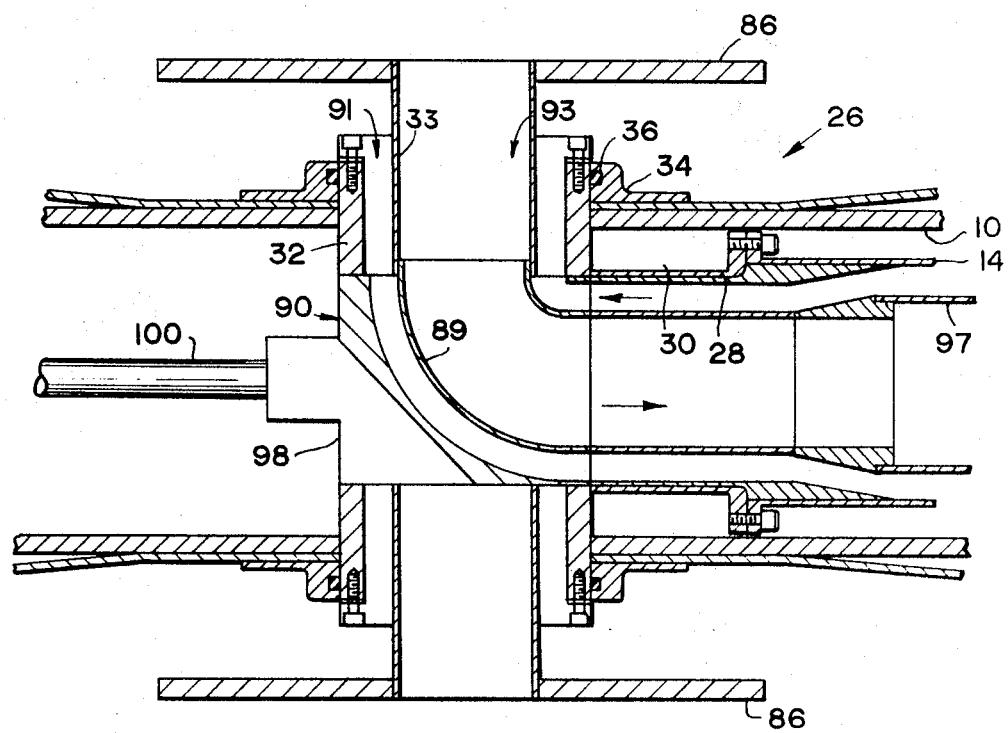
FIG. 2 is a fragmentary sectional view showing details in the construction of the valve mechanism.
Figure 4:
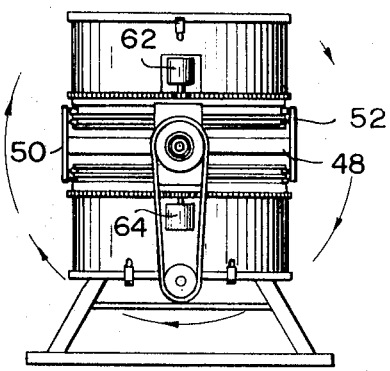
FIG. 4 is a cross-sectional view taken along the line 4-4 of FIG. 1.

Referring now to the drawings, the molding apparatus comprises a pair of cylindrical drums 10 and 12 carried by horizontal trunnion 14 supported at its ends by bearings 16 and 18 mounted on legs 20 and 22 extending upwardly from a base 24. Each of the drums 10 and 12 is mounted on the trunnion 14 by means of a rotary seal assembly 26 best shown in FIG. 2. Each assembly comprises an annular plate 28 fixed to the trunnion 14 and retaining an annular gasket 30 disposed about a hub 32 extending between the tubular trunnion 14 and the interior of the drum 10. The upper portion of the gasket 30, as viewed in FIG. 2, rotatably engages the inner wall of the drum 10 and the drum 10 may be rotated about the axis of tube 33 concentrically mounted in the hub. A flange 34 is mounted over the hub 32 and sealed with an O-ring 36. The drums are also rotatably mounted to the trunnion 14 by means of a peripheral roller or slide block system. This system, as best shown in FIGS. 1 and 4, comprises end plates 36 and 38 fixed to either end of the rotatable trunnion 14 and each carrying at their outer ends a pair of rollers or slide blocks 40 and 42 which ride in an annular channel 44 formed about the outer cylindrical surface of each drum and bear against an annular shoulder 46 formed within the channel.

A second pair of rollers or slides is provided at the end of each radial arm 48 and 50 extending perpendicularly from the midportion of the trunnion 14. A similar plate 52 is mounted at each end of the radial arm and carries two sets of rollers or slides which also ride in the channel 44. The drums are thus uniformly supported for rotation about the axis of the tube 33 with the load of the drums being evenly distributed by means of the roller or slide and channel support.

It will thus be apparent that each of the drums 10 and 12 is independently rotatable of the other about the axis of the tube 33. Both drums, however, are mounted for rotation about the horizontal axis of the trunnion 14 which is driven by means of a motor 54 through a belt 56 or other means and pulleys 58 and 60. While the drums are rotated together about the horizontal axis, they are separately driven about the axis of the tube 33 by means of separate driving means such as the hydraulic motors 62 and 64 shown.

Each motor 62 and 64 is mounted to the plate 38 and is provided with spring loaded pinion 66 which meshes with an annular rack 68 fixed about the outer surface of the drum. In the illustrated embodiment a roller link chain secured to the drums serves as a rack. Each hydraulic motor is connected by means of flexible conduits 70 and 72 to the hydraulic system to be described more fully in connection with FIG. 6. When the hydraulic motor is actuated the engagement between its pinion and the annular rack will cause the associated drum to rotate about the drum axis which lies along the center of the tube 33. Alternatively, a cable may be wrapped about the drum and about a motor driven pulley to drive the drums. Insofar as each drum is driven by its own motor, the drums may be rotated at independently different speeds whereby molding materials having different characteristics may be molded at the same time with one type of material in one drum and another material in the second drum. Also the arrangement permits the operator to stop the rotation of both drums about the horizontal axis and idle one of the drums about the axis of the tube 33 perpendicular to the force of gravity while the other drum is stopped, the finished products stripped from their molds and fresh charges of plastic added. While the molds may be mounted wholly within the drums through a removable or hinged cover 74, a preferred arrangement for mounting certain types of molds, such as those used to make baskets and the like, is shown in FIG. 1. This arrangement, as best shown in FIG. 1, involves mounting molds 76 to the cover 74 through openings 75 formed in the cover so that the body of the mold is within the drum but the interior of the mold is accessible through a removable lid 77 mounted over the mold. A lip with spacers form a small clearance between the mold and cover which insure that the molded product is heated to the trim line and also permits cooling air or steam to escape. During heating the balanced heat system produces little leakage through the clearance. With this arrangement only the mold surfaces which are needed to be heated are actually heated, and the mold itself is accessible from the outside through the lid 77 for quick and easy loading and stripping.

Each drum preferably is provided with a layer 80 of thermal insulating material to minimize heat losses within the system.

Each drum is provided with a baffle 86 on the end of tube 33 positioned in spaced opposition to the discharge end of the hub 32 to deflect the inwardly coming heating or cooling medium outwardly about the drum to insure complete circulation of the medium. The tube 33 is mounted coaxially within the hub 32 and registers with a cooperating bent tube 89 in a rotary valve 90. The tube 33 serves as a return line whereby the heated air will enter the drum through an outer annular passage 91, circulate in around the walls of the drum and return back through an inner annular passage 93 to the heating system.

The heating and cooling medium, preferably air or air and water, is introduced from opposite ends of the trunnion 14, which is hollow, through the rotary valve 90 mounted at the center of the trunnion and adapted to communicate with the passages in the hubs 32. The valve 90 is provided with coaxial passages for the heating side, one for heat inlet and one for heat return and a cool air inlet 98 for a cold shocking line to introduce air, air and water, $CO_2$ or the like separately into the drum. The coaxial valve passages are open to the right-hand end of the valve as viewed in FIG. 2, registering with coaxial passages formed by concentric trunnion 14 and tube 97 and turn at right angles to register with the hub passages of either the drum 10 or the drum 12 depending upon the rotary position of the valve. The passage 98 communicates with a hollow left-hand side of the trunnion through which extends a control tube 100 fixed to the left-hand end of the valve block. The valve 90 is connected by means of the tube 100, which extends through the cold end of the trunnion 14, to a valve actuating the mechanism 102 comprising a rack 104 in mesh with a pinion 106 fixed to the tube 100. An air or hydraulically actuated cylinder 108 is drivingly connected to the rack 104 by means of a crossarm 110 with a valve 112 connected to the cylinder and a solenoid 114 employed to operate the valve 112 automatically or manually according to a predetermined schedule.

The pinion 106 is provided with an integral one-way clutch 116 which permits the tube 100 to rotate freely in one direction whereby the valve body 90 will turn together with the trunnion 14 when rotated by the motor 54. The pinion 106 thus will remain stationary in mesh with the rack 104 as the tube 100 rotates in its normal direction of rotation. However, when the rack 104 is reciprocated by the cylinder 108 the pinion 106 rotates, engages the clutch 116 and rotates the tube 100 through a turn of approximately 180°. The tube 100, being fixed to the valve body 90, will rotate the valve 180° so that the heating and cooling conditions in the two drums will be reversed, heat being introduced to the drum which previously had been cooled and cooling air being introduced to the drum which previously had been heated. This arrangement permits heating and cooling cycles to be alternated as the drums are being rotated.

As viewed in FIG. 1 heated air may be furnished from the right-hand side of the apparatus through the trunnion 14 from a hot air heater and blower unit generally indicated by reference character 118. On the left-hand side of the trunnion cooling air is introduced from a blower 120 through a conical housing 122 into the left-hand end of the trunnion. Both the heater unit 118 and blower unit 120 are controlled by an automatic timing control unit indicated in block form by reference character 122 in FIG. 6.

Figure 6:
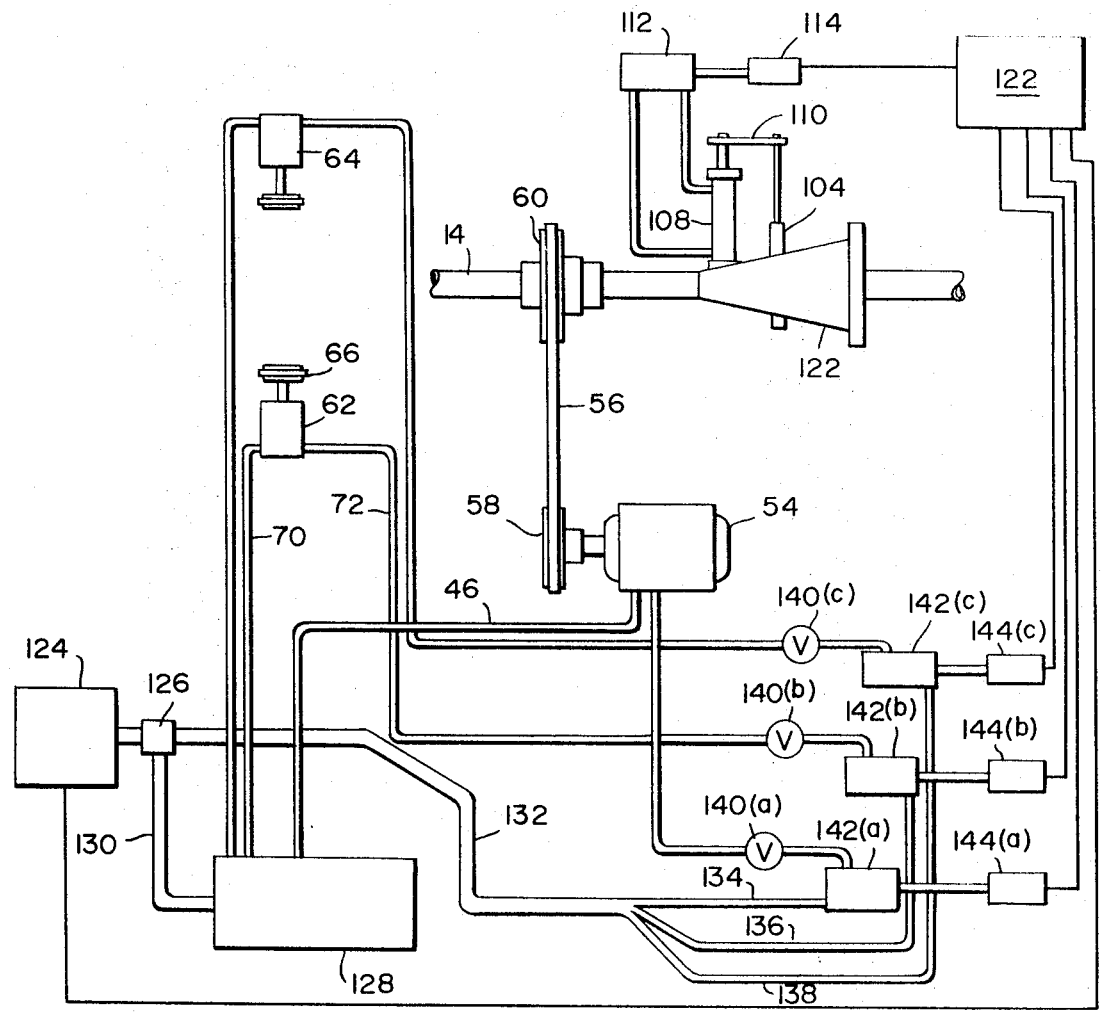
FIG. 6 is a schematic diagram of the hydraulic system employed in the apparatus, and, FIG. 7 is a view similar to FIG. 1 showing a modification of the invention.

Referring now more particularly to FIG. 6 the hydraulic control system of the apparatus will be described in detail. The system is generally organized about a main electric motor 124 which drives a hydraulic pump 126 taking suction on a sump 128 through a conduit 130. The pump 126 discharges through a line 132 and manifolds into lines 134, 136 and 138, each with a flow control valve 140 (a), (b) and (c) and a cutoff valve 142 (a), (b) and (c) actuated by solenoid 114 (a), (b) and (c). The line 134 feeds to the hydraulic motor 54 which drives the trunnion 14 about its horizontal axis and a return line 146 runs from the hydraulic motors 62 and 64 which rotate the drums independently about their own axis. These motors are both provided with return lines back to the sump 128.

The timing control unit 122 is operatively connected to the solenoids 144 (a), (b) and (c) as well as to the motor 124 and the solenoid 114 which controls the position of the trunnion valve 90. With this system, the drums may be preset to rotate for independent predetermined time limits with the speed of rotation being controlled by the flow control valves 140 (a), (b) and (c). One drum may be set to rotate at a particular speed for a given length of time while the other drum may be set to rotate at a different speed and for a different length of time, thus providing flexible control over the operation of the apparatus permitting molding of a wide variety of materials.

Referring again to FIG. 1 the heating unit 118 will be described in detail. This unit includes a fire box 150 mounted to the side and slightly below fixed tubular housing 152 providing a pair of concentric annular passages 154 and 156 which register with the heat inlet and return passages defined by tube 97 and trunnion 14. The inner passage 156, which is the return line, communicates through a side port 158 with the fire box 150 adjacent a burner 160. The burner 160 is supplied with fuel such as gas, oil or the like through a line 162 and directs a flame 164 rearwardly towards a centrifugal blower 166. The connecting port 158 between the burner box and the passage 156 is restricted to produce a venturi effect so that the burner flame and the blower 166 cooperate to provide a positive evacuation of the heat return line. This produces a balanced heating system in which the pressure within the drum 10 or 12 remains relatively low being close to atmospheric pressure during the heating cycle. Under these balanced conditions very little heat escapes out through the clearance between the molds 76 and the lid opening 75. The air is reheated in the burner box and drawn by the blower 166 for delivery forwardly again through the passage 154. By reheating the same air substantial heat savings are obtained.

Figure 5:
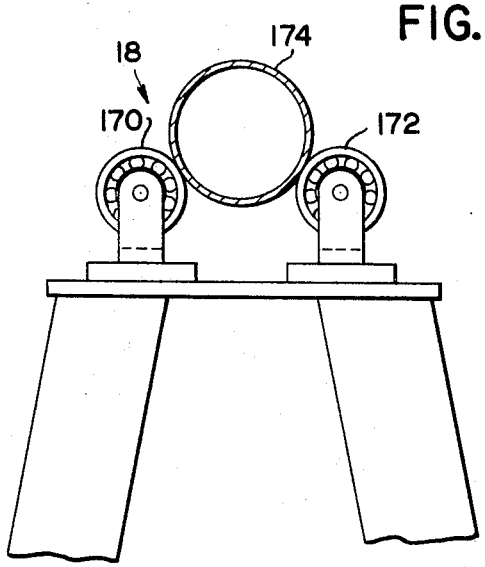
FIG. 5 is a cross-sectional view taken along the line 5-5 of FIG. 1.
Figure 3:
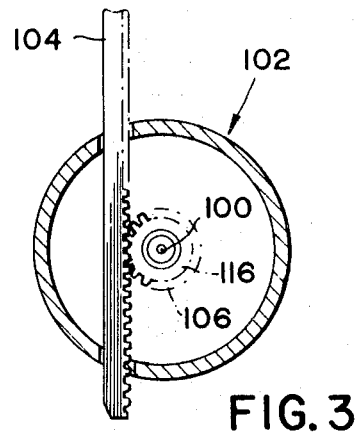
FIG. 3 is a cross-sectional view taken on the line 3-3 of FIG. 1.

By reason of the relatively high temperatures produced by the heated air, conventional bearings are not suitable for supporting the trunnion 14 since conventional ball bearings or the like cannot long stay lubricated and quickly burn out under the high operating temperatures. To overcome this problem, external roller bearings, such as shown in FIGS. 1 and 5, are provided. This bearing arrangement comprises a pair of rollers 170 and 172 mounted on the upper end of the legs 20 and 22 and engaging at spaced points the lower portion of an annular sleeve 174 fitted over the end of the trunnion 14. The reduced end of the housing 152 extends into the sleeve but the sleeve rotates while the housing remains fixed. In this fashion, the bearings are more or less remote from the heat source yet provide efficient rotating support for the relatively heavy and hot trunnion.

While the invention has been described with particular reference to the illustrated embodiment, it will be understood that numerous modifications thereto will appear to those skilled in the art. For example, in place of the external mold mounting arrangement shown in FIG. 1 the molds may be mounted entirely within the drums. Preferably any such mounting should include a bracket which supports the mold or molds within the drum and is itself removable. Thus a bracket on which one or more molds are mounted may be placed in the drums, the parts molded and cured and then the bracket together with the molds entirely removed for stripping and recharging. Other brackets may be kept on hand and precharged so that they may be immediately mounted in the drum once the preceding bracket and molds have been removed so as to minimize the down time of the drum each time a batch is processed.

Figure 7:
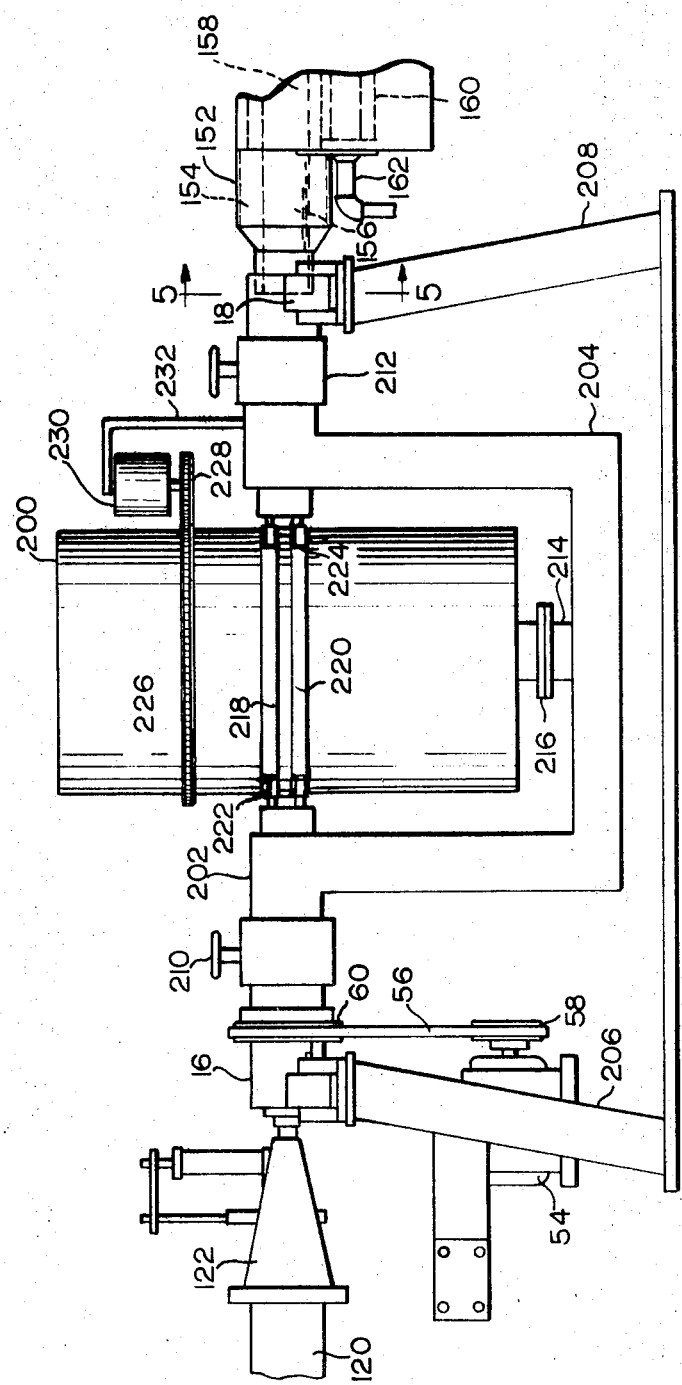

Referring now to FIG. 7 there is illustrated a modification of the invention and in this embodiment a single large drum 200 is employed for use in molding extra large objects. The drum is supported by means of a tubular trunnion 202 having an offset portion 204 and supported by legs 206 and 208 as in the principal embodiment. The heating and cooling equipment for delivering the heating and cooling medium through the trunnion is the same as the principal embodiment and therefore will not be described in detail other than to indicate that a heated fluid medium is delivered from the right-hand side of the FIG. 7 apparatus and the cooling medium is delivered from the left-hand side thereof. Valves 210 and 212, preferably solenoid-actuated, are provided in the trunnion for controlling the flow of the heating and cooling medium through the offset portion 204 and into the drum 200.

The offset portion is provided with a central neck 214 which engages a rotary seal 216 connected to the drum 200 along its longitudinal axis. It will be understood that the heating and cooling medium flow through the offset portion, through the neck, past the rotary seal and into the drum 200 as the unit is operated.

The drum 200 is provided with a pair of circumferential grooves 218 and 220 similar to the grooves 44 of the principal embodiment and these grooves cooperate with sets of rollers 222 and 224 mounted along the axis of the trunnion to support the drum as it is rotated both about its longitudinal axis and about the trunnion axis. A track 226, similar to the track 68 of the principal embodiment, is mounted about the outer surface of the drum and is engaged by means of a gear 228 driven by a motor 230 for rotating the drum about its longitudinal axis. The motor 230 is mounted by a bracket 232 to the trunnion.

The trunnion is driven in the same fashion as the principal embodiment so that the drum is rotated about the horizontal axis of the trunnion and the motor 230 drives the drum about its own longitudinal axis. This arrangement permits a single drum to be employed which is particularly useful for molding large objects which cannot be accommodated by a drum of the principal embodiment. The system employs the same balanced heating system as disclosed in connection with the FIG. 1 embodiment as well as the drum drive and support arrangement.

Having thus described the invention what we claim and desire to obtain by Letters Patent of the United States is:

1. Rotary molding apparatus, comprising
   a. at least a pair of drums,
   b. first support means mounting said drums for rotation about a common first axis,
   c. independent first drive means operatively connected to said first support means for rotating said drums simultaneously about said first axis,
   d. second support means mounting each of said drums for independent rotation about a second axis perpendicular to said first axis,
   e. second drive means operatively connected to each drum for rotating said drums independently of said first drive means and of one another about said second axis,
   f. air heating and air cooling means operatively connected to said apparatus and,
   g. control means for delivering heated and cooled air selectively to said drums.

2. Rotary molding apparatus according to claim 1 wherein said second drive means includes a variable speed motor for each drum mounted to said first support means and drivingly connected to its associated drum.

3. Rotary molding apparatus according to claim 2 wherein each of said drums is formed with teeth about its cylindrical surface and a gear driven by said motor is in mesh with said teeth.

4. Rotary molding apparatus according to claim 1 wherein each of said drums is formed with an annular shoulder about its cylindrical surface concentric with said second axis and bearing members fixed to said second support means and engaging said shoulder.

5. Rotary molding apparatus, comprising
   a. a pair of drums,
   b. first tubular support means mounting said drums for rotation about a common first axis,
   c. drive means for rotating said drums simultaneously about said first axis,
   d. second support means mounting said drums for independent rotation about a second axis perpendicular to said first axis,
   e. independent drive means operatively connected to each drum for rotating said drum independently of said first drive means and of one another about said second axis,
   f. conduit means communicating said tubular support with said drums,
   g. air heating and blowing means for delivering a flow of heated air into one end of said tubular support and cool air delivery means for delivering a flow of cool air into the other end of said tubular support,
   h. a valve mounted in said tubular support and adapted to direct the heated air selectively into one drum and the cool air into the other drum, and,
   i. control means for moving said valve to alternate the flow of heated and cool air between the drums.

6. Rotary molding apparatus, comprising
   a. at least a pair of drums,
   b. first support means mounting said drums for rotation about a common first axis,
   c. first drive means for rotating said drums about said first axis,
   d. second support means mounting each of said drums for independent rotation about another axis perpendicular to said first axis,
   e. independent drive means operatively connected to each drum for rotating each of said drums independently of one another about each drums other axis,
   f. said first support means including a trunnion formed with parallel passages communicating at one end with at least one of said drums and a forced air heater communication with the other end of said passages for circulating and reheating air through said passages and least one of said drums, and,
   g. a mold mounted to each of said drums, said mold having its heat transfer surfaces extending within said drum through the wall of said drum, said mold being open and accessible through the drum wall and cover means for closing said mold.

7. Rotary molding apparatus according to claim 6 wherein said first support means includes at least a pair of roller bearings externally supporting said trunnion for rotation about said first axis.

8. Rotary molding apparatus, comprising
   a. at least a pair of drums,
   b. first support means mounting said drums for rotation about a common first axis,
   c. second support means mounting said drums for rotation about a second axis perpendicular to said first axis,
   d. drive means for rotating said drums about said axes,
   e. a mold mounted to each of said drums, f. said mold having its heat transfer surfaces extending within said drum through the wall of said drums,
g. cover means for closing said mold, and,
h. means for heating and cooling said drums,
i. said drums being formed with openings about said molds for releasing positive cooling pressure from said drum.

9. Rotary molding apparatus, comprising
a. a cylindrical drum,
b. a tubular trunnion mounted for rotation about its longitudinal axis and formed with an offset portion,
c. rotary support means mounting said drum in said offset portion perpendicular to said trunnion,
d. control means for selectively delivering hot and cool air through said trunnion into said drum, and,
e. drive means for rotating said trunnion with said drum about one axis and separately rotating said drum simultaneously about another axis perpendicular to said one axis.

10. Molding apparatus, comprising
a. a mold adapted to receive a charge of thermosetting material
b. walls spaced from said mold and forming a vented enclosure thereabouts,
c. a cover movably mounted to said walls and detachably supporting said mold, said cover being formed with an opening through which said mold extends,
d. a source of heated air and a source of cooled air,
e. conduit means connecting said sources to said enclosure,
f. control means for selectively delivering heated and cooled air to said enclosure for heating and cooling said charge, and,
g. power means for rotating said walls together with said mold about at least two different axes.